Patented June 16, 1925.

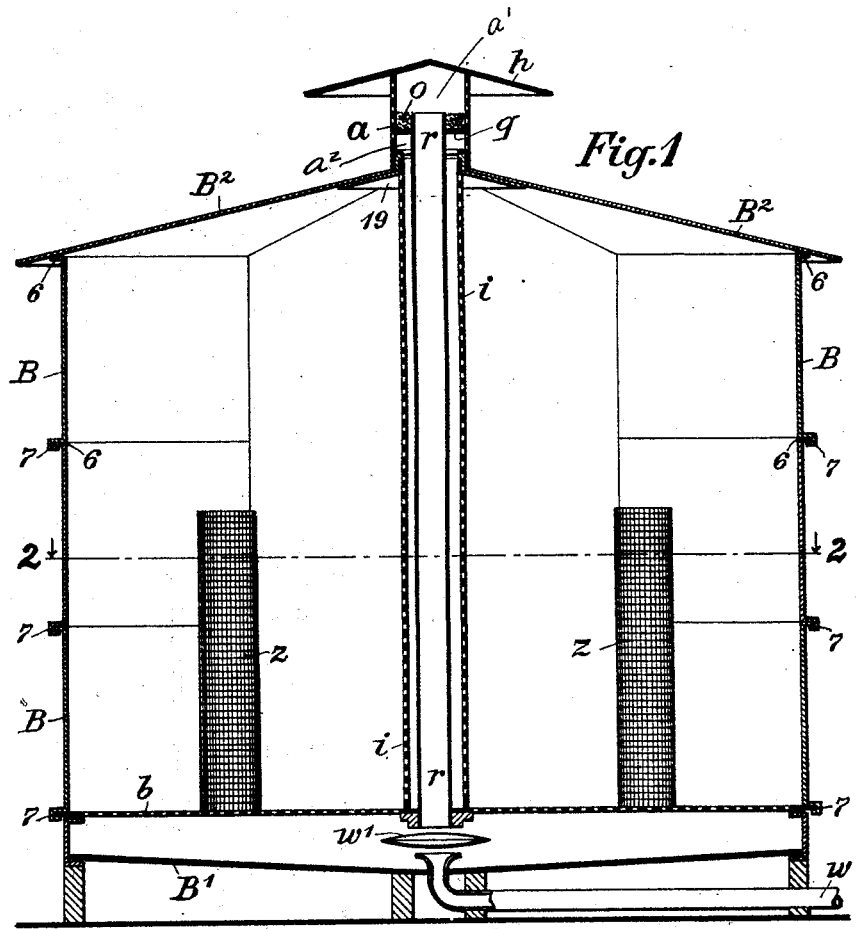
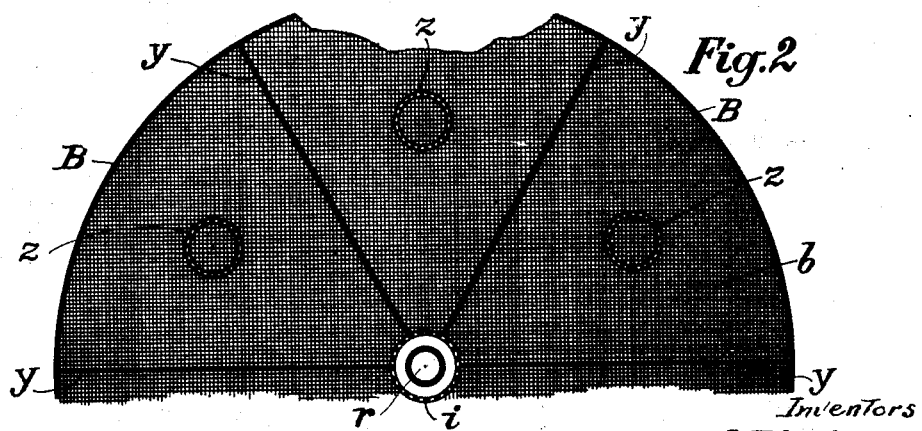

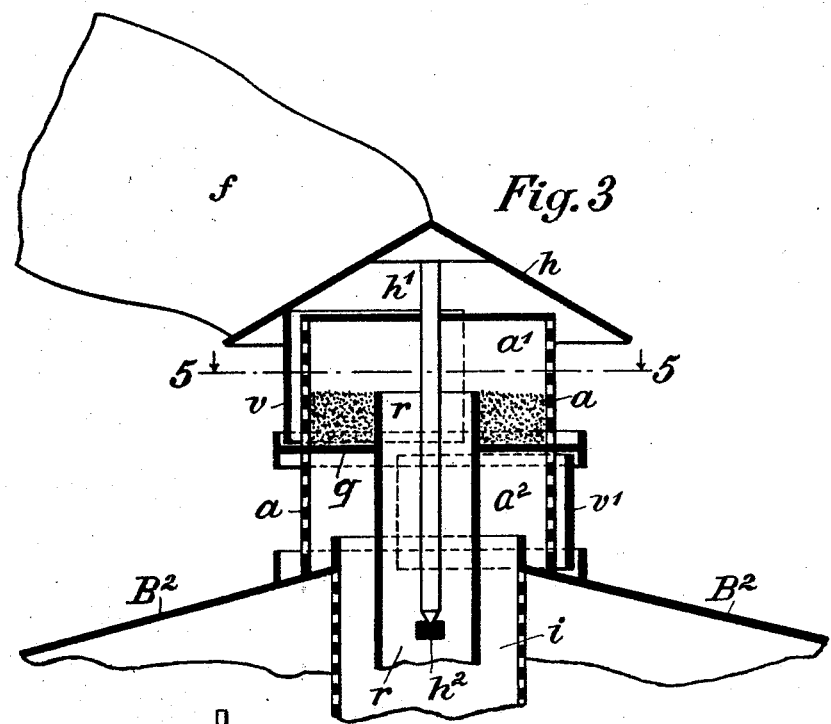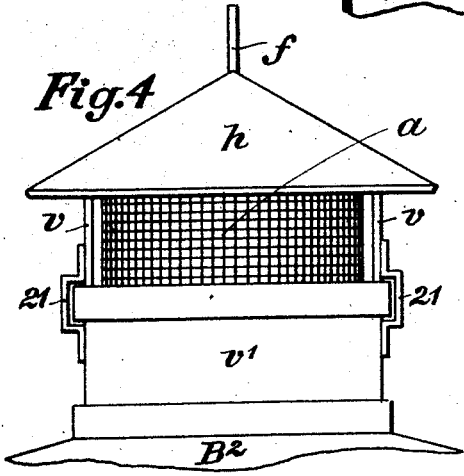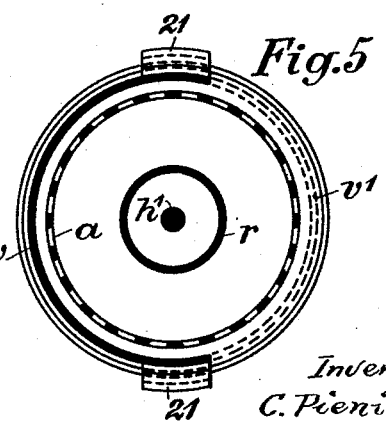

1,542,721

UNITED STATES PATENT OFFICE.

CHARLES PIENING AND MICHAEL HEINEKEN, OF HAMBURG, GERMANY.

SYSTEM OF GRAIN VENTILATION.

Application filed June 23, 1924. Serial No. 721,947.

*To all whom it may concern:*

Be it known that we, CHARLES PIENING and MICHAEL HEINEKEN, citizens of the German Republic, both residing at Hamburg, Germany, have invented certain new and useful Improvements in Systems of Grain Ventilation, for which we have made applications for patents in Germany Aug. 9, 1922, and in Hungary Oct. 13, 1922, and of which the following is a specification.

This invention relates to arrangements for storing and preserving grain and similar material in a closed receptacle by means of air conducted through the material. According to the invention the receptacle has a perforated tubular extension on the roof in which, by a partition, two compartments are formed, the upper compartment being connected by a tube with the compartment below a perforated partition, a perforated tube enclosing said connecting tube being fixed in the lower compartment of the tubular extension so that the inner tube and the outer tube communicate with one another through the intermediary of the perforated partition.

The compartments formed in the tubular extension are of unequal size, the upper compartment being larger than the lower compartment. Owing to this difference in size a draught is produced by the wind blowing along the tubular extension, said draught being more or less strong in accordance with the force of the wind. Owing to this draught fresh air is continuously sucked into the receptacle through the inner tube and the perforated partition so that the grain stored in the receptacle is well aired. The ventilation can be further increased by arranging above the tubular extension a cowl adjusting itself automatically in accordance with the direction of the wind, said cowl comprising two screens of which the one forms a wind-catch for the upper compartment of the tubular extension, the other screen serving for leading the wind along the lower compartment of said tubular extension. For this cowl with the two screens, fans may be substituted, one for each compartment, the one fan serving to force air into the inner tube, the other one serving to suck air from the perforated outer tube.

An embodiment of the invention is shown by way of example on the accompanying drawings, in which:

Fig. 1 is a vertical central section of the apparatus.

Fig. 2 is a cross section on line 2—2 of Fig. 1.

Fig. 3 is a vertical central section through a tubular extension on the roof of special construction.

Fig. 4 is a side elevation of Fig. 3.

Fig. 5 is a cross section on line 5—5 of Fig. 3.

The wall of the silo or receptacle is indicated by B, the bottom by B' and the top plate by $B^2$. Above the bottom B' a perforated bottom plate $b$ is arranged which is connected with the top or cover plate $B^2$ by a tube $i$ which is perforated on its entire length and forms the inner wall of the receptacle. In this perforated tube $i$ a tube $r$ is concentrically arranged the lower end of which is fixed in the lower end of the perforated tube $i$, the upper end of tube $r$ being mounted in a horizontal partition $q$ of a tubular extension $a$ on the top plate or roof $B^2$. This tubular extension $a$ is divided by the horizontal partition $q$ into two compartments $a'$ and $a^2$. The inner tube $r$ communicates with compartment $a'$ and the perforated tube $i$ communicates with compartment $a^2$. The wall of the tubular extension $a$ is perforated above and below the horizontal partition $q$. The lower end of the inner tube $r$ terminates in the space between the bottom B' and the intermediate bottom $b$.

The arrangement described serves to conduct fresh air through the compartment $a'$ and the inner tube $r$ into the space between the two bottom plates of the receptacle. This fresh air ascends through the perforated intermediate bottom plate $b$ and through the grain stored on the same and flows out through the perforated inner wall $i$ and compartment $a^2$.

In order to make the ventilation in the grain perfect a plurality of tubes $z$ may be arranged on the perforated bottom plate $b$ and communicate with the space between said perforated bottom plate $b$ and the floor B'. These tubes $z$ have perforated walls. The receptacle or silo shown in Figs. 1 and 2 is subdivided into a number of chambers by vertical radial walls $y$, each chamber being designed for a special kind of grain. In this case each chamber has its own door.

In the floor B' which is inclined towards the centre a tube $w$ terminates at the centre which is designed for the admission of a gaseous fluid for disinfecting the stored grain, for instance hydrocyanic acid, formaline or the like. A lens-shaped disk $w'$ arranged above the orifice of the tube $w$ serves for uniformly distributing the disinfecting fluid. The central part of the top plate or roof $B^2$ of the receptacle rests upon a cup 19 (Fig. 1) suspended on the perforated tube $i$ and arranged in such a manner that the tubular extension $a$ may be mounted on it. A roof $h$ is either rigidly or movably fixed on the tubular extension $a$. When the roof $h$ is revolubly mounted it is carried by a vertical shaft $h'$ (Figs. 3 to 5) the lower end of which is journaled in a step bearing $h^2$ fixed in the inner tube $r$. The roof $h$ has two vertical screens $v$ and $v'$, screen $v$ serving as wind catch for the upper compartment $a'$ of the tubular extension, the other screen $v'$ serving to direct the wind vertical of the lower compartment $a^2$. That is to say, the wind is directed around the lower compartment to exert a suction effect on the side opposite that against which the wind is blowing. The two screens $v$, $v'$ are connected with one another by shackles 21. A weatherboard $f$ on the roof $h$ adjusts this roof according to the direction of the wind so that the air caught by screen $v$ is forced into the compartment $a'$ and through the inner tube $r$ into the space between the floor B' and the intermediate bottom $b$, the wind flowing along the screen $v'$ exerting a sucking action which assists the escape of the air through the silo so that this silo as well as the grain stored in it are well aired. For the revoluble roof-shaped hood $h$ with weatherboard $f$ one or two fans may be substituted. One fan may be used for forcing the air into the inner tube $r$ or one fan may be used for sucking the air from the tube $i$ or two fans may be arranged one above the two tubes $r$ and $i$, the one fan working on pressure and the other on suction.

The inner tube $r$ projects as shown in Fig. 3 above the partition $q$ in the tubular extension $a$ so that an annular space is formed between said tube and the wall of compartment $a'$. This annular space is filled with a hygroscopic substance $o$, for instance slacked lime, for extracting the moisture of the air before the same enters into tube $r$.

We claim.—

1. A combination with a receptacle having a closed bottom, a roof, a tubular extension on the roof of said receptacle, a horizontal partition in said tubular extension dividing the same into two compartments for the inlet and outlet of air, a perforated bottom plate at some distance above the floor of said receptacle, a tube connecting the upper compartment of said tubular extension with the space between the floor and the said bottom plate in the receptacle, a tube with perforated wall fixed with its upper end in the lower compartment of said tubular extension and with its lower end on said perforated bottom and enclosing said first mentioned tube.

2. The combination with a receptacle having a closed bottom, a perforated partition above said bottom, an extension above the top, a partition dividing the extension into upper and lower compartments for the inlet and outlet of air, an imperforate tube leading from the space above the partition in the extension to below the partition in the receptacle, and a perforated tube concentric with the first mentioned tube and opening to the space below the partition in the extension.

3. The combination with a receptacle having a closed bottom, a perforated partition above said bottom, an extension above the top, a partition dividing the extension into upper and lower compartments for the inlet and outlet of air, an imperforate tube leading from the space above the partition in the extension to below the partition in the receptacle and a perforated tube concentric with the first mentioned tube and opening to the space below the partition in the extension, said perforate tube extending vertically of the receptacle and being connected at its lower end to the perforated partition in the receptacle.

In testimony whereof we affix our signatures in presence of two witnesses.

CHARLES PIENING.
MICHAEL HEINEKEN.

Witnesses:
FRIEDRICH JULIUS FOSHS,
E. KASPAREK.